United States Patent [19]

Momiyama

[11] 4,240,703
[45] Dec. 23, 1980

[54] TELEPHOTO LENS

[75] Inventor: Kikuo Momiyama, Kanagawa, Japan

[73] Assignee: Canon Kabushiki Kaisha, Tokyo, Japan

[21] Appl. No.: 918,353

[22] Filed: Jun. 23, 1978

[30] Foreign Application Priority Data

Jun. 28, 1977 [JP] Japan .................... 52-76728

[51] Int. Cl.³ .................. G02G 9/62; G02B 9/64
[52] U.S. Cl. .................... 350/214; 350/215
[58] Field of Search ............ 350/214, 215, 177, 207, 350/255

[56] References Cited

U.S. PATENT DOCUMENTS 4,045,128  8/1977  Momiyama ............ 350/255 X
4,068,929  1/1978  Yokota ................ 350/215

FOREIGN PATENT DOCUMENTS 945652  1/1964  United Kingdom ............ 350/214

*Primary Examiner*—Paul A. Sacher
*Attorney, Agent, or Firm*—Toren, McGeady and Stanger

[57] ABSTRACT

A telephoto lens having a relatively short focal length compared to what is generally accepted as the focal length of a telephoto lens and corrected for aberrational deviations throughout the focusing range. The lens comprises a positive first (counting from the front) member, negative second and third members, and a positive fourth member. The first member consists of two positive components and one negative component, the frontmost and rearmost lens surfaces of each of said second, third and fourth members being convex and concave to the front and rear respectively, and said fourth member serving to cancel the residuals of spherical aberration and distortion. Focusing down to shorter object distances is performed either by forward axial movement of the entire system, or by rearward axial movement of the third member with the other members being stationary.

9 Claims, 9 Drawing Figures

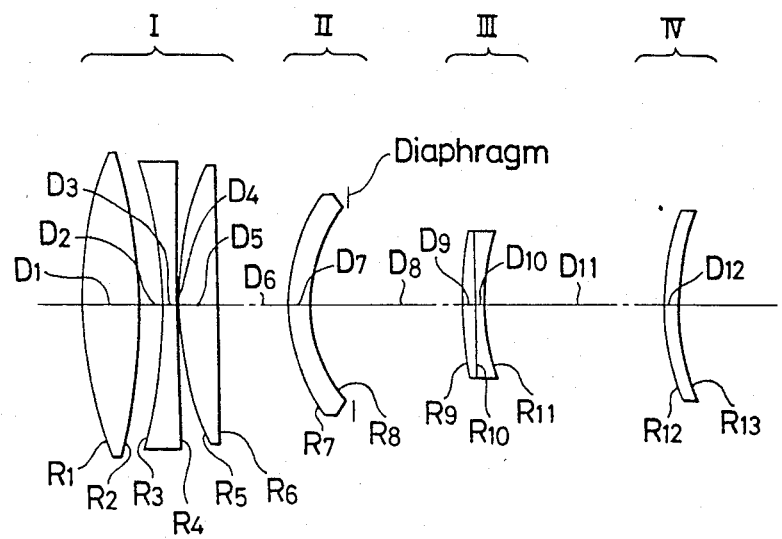
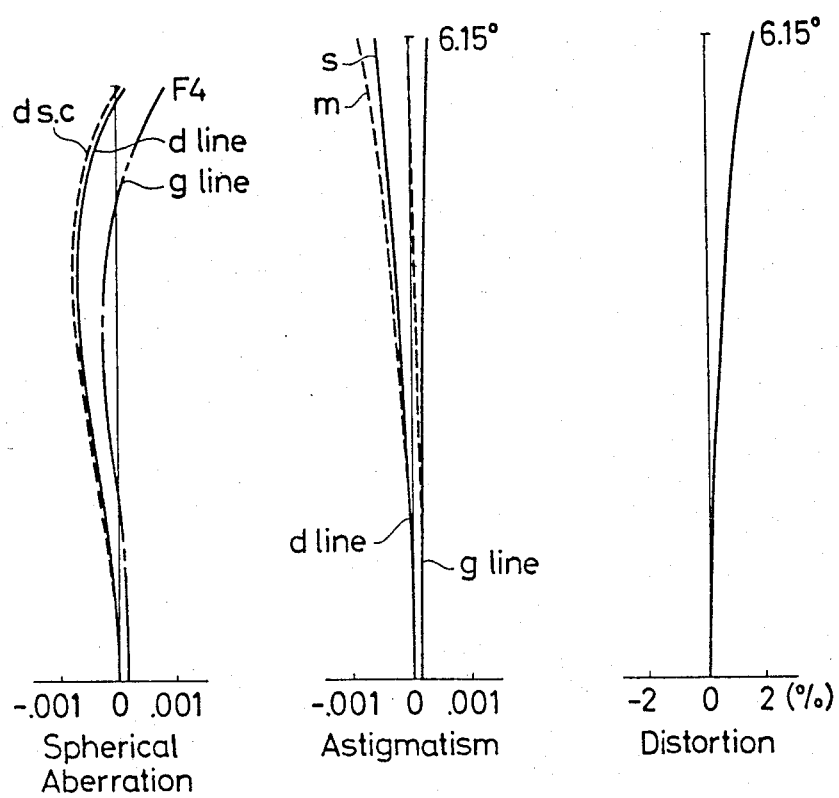

TELEPHOTO LENS

BACKGROUND OF THE INVENTION

This invention relates to photographic lenses and more particularly to telephoto lenses.

The present inventor has proposed a practical example of a telephoto lens having focusing provision made at a part of the rear lens group in U.S. Pat. No. 4,045,128. The design features of this lens are, however, because of their adaptation to a comparatively long focal length with a narrow image angle, found to lead to large deviations of aberrations, namely, distortion, astigmatism, coma, and chromatic variation of astigmatism or of coma throughout the focusing range when applied to a lens system with the same arrangement of the components but having a shorter focal lenght, since the other part of the rear group which remains stationary during focusing can not contribute to a good compensation for the residual of aberrations introduced by the forwardly located lens components. As the angular field coverage is increased, therefore, the amount of positive distortion left uncorrected at the image is increased to an unacceptable level. This is also true in the state of correction of spherical aberration.

SUMMARY OF THE INVENTION

An object of the present invention is to provide a telephoto lens having an improved imaging performance over an extended angular field.

Another object is to provide a photographic lens having a member movable for focusing with limitation of the image aberrations to a minimum.

Still another object is to provide a photographic lens bodily movable for focusing to give a high standard of correction of the various aberrations throughout the focusing range.

To achieve this, according to embodiments of the present invention, on the image side of the focusing member there is provided a member having a weak refractive power and preferably configured with its frontmost and rearmost surfaces convex and concave toward the front and rear respectively, and a member which would be otherwise positioned just in front of the focusing member in what is generally accepted as the telephoto lens and which is adapted for the purpose of aberration corrections is provided with a comparatively strong negative refractive power and preceded by a member at a shorter distance therefrom.

BRIEF DESCRIPTION OF THE DRAWINGS

FIG. 1 is a block diagram of one embodiment of a telephoto lens according to the invention.

FIG. 2 is a graphic representation of spherical aberration, sine condition, astigmatism and distortion in the lens of FIG. 1 with an object at infinity.

DESCRIPTION OF THE PREFERRED EMBODIMENTS

The telephoto lens of the invention generally comprises four optically aligned members of which the first (counting from the front) is of positive power, and consists of a plurality of lens elements, the second is of negative power, the third is of negative power and the fourth is of positive power, and which is characterized by the following relationships referred to a total focal length of unity:

(1) $1 < f4 < 7$
(2) $0.08 < S3 < 0.2$
(3) $1.2 < |f2| < 2.5; f2 < 0$
(4) $0.2 < (S1/S2) < 1.5$ wherein f2 and f4 are the focal lengths of the second and fourth members respectively; and S1, S2 and S3 are the axial air separations between the successive two members, the S2 and S3 being defined with the third member focused for infinitely distant object when focusing is performed by that member.

Condition (1) is to determine an optimum focal length of the fourth member for a compromise between the requirements of achieving satisfactory compensation for the residual of distortion as being secured by the upper limit, and of preventing spherical aberration and astigmatism from being deteriorated as when the lower limit is violated.

Condition (2) assists in compensating for the distortion under Condition (1) since the axial separation of the fourth member from the third member is comparatively long. When this separation exceeds the upper limit, however, the diameter of the fourth member is increased above an acceptable level. To facilitate correction of positive distortion at the image under the fulfilment of Conditions (1) and (2) without causing any increase in the other aberrations particularly spherical aberration, it is preferred that the fourth member is configured to a forwardly convex meniscus form having a relatively weak positive refractive power with production of negative distortion.

Conditions (3) and (4) enable the second member to contribute to a reduction of the difficulty of correcting negative spherical aberration in the first member which in turn causes the other aberrations such as astigmatism, coma, chromatic astigmatism and chromatic coma to produce magnitudes below acceptable levels, as the refractive power of the second member is made relatively strong under Condition (3) and the axial air separation between the second and third members is made long to position the second member nearer to the first member under Condition (4), thereby a large positive spherical aberration is introduced into the system by the second member. When the upper limit of Condition (3) is violated, the amount of positive spherical aberration produced is not large enough for that purpose. When the lower limit is violated, higher order aberrations will be produced. When the upper limit of Condition (4) is violated, the sufficient assistance towards production of the positive spherical aberration by the second member under Condition (3) can not be obtained. When the lower limit is violated, higher order aberrations become objectionable.

Figure 3:
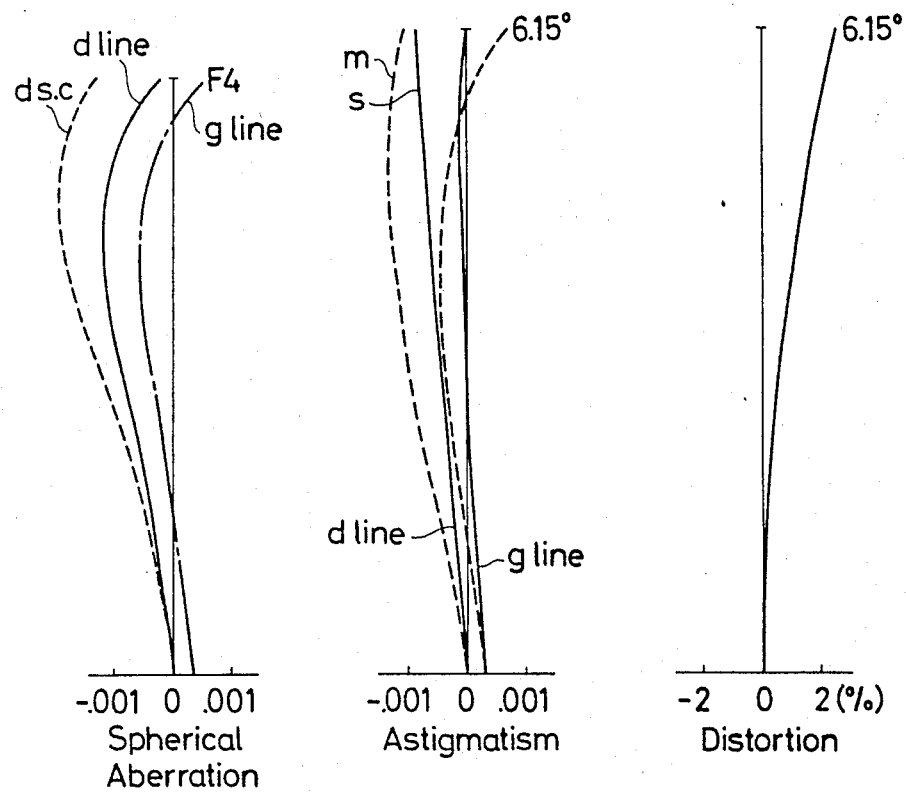
FIG. 3 is a similar representation with an object at a short distance of 9.13 f.
Figure 4:
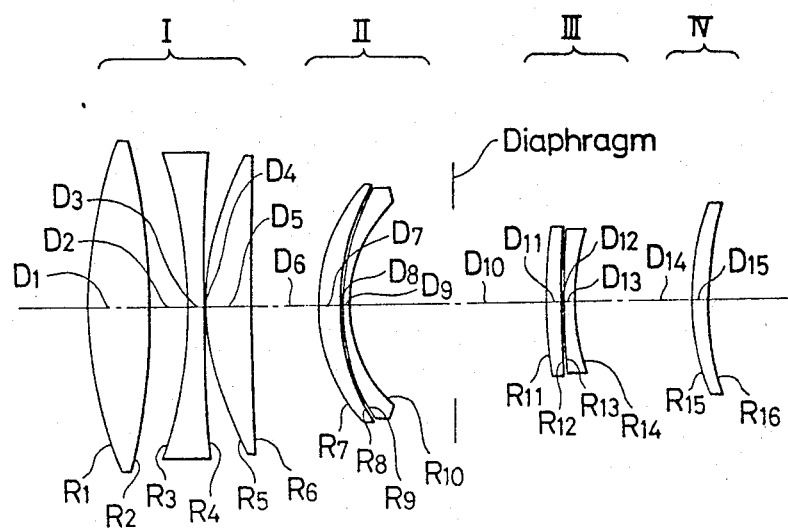
FIG. 4 is a lens block diagram showing another embodiment of the invention.
Figure 5:
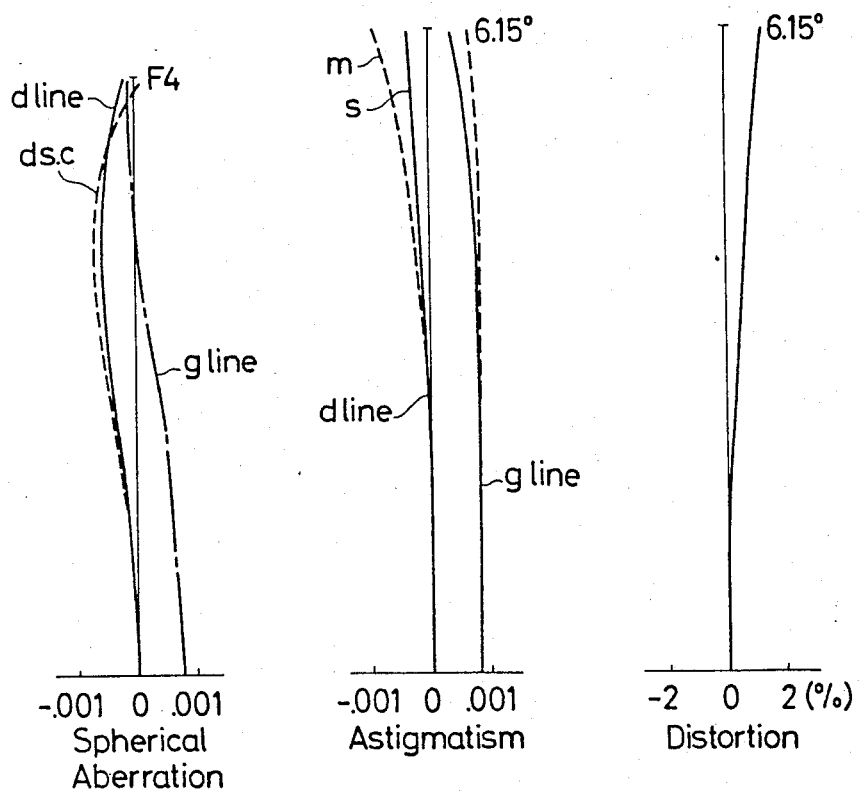
FIGS. 5 and 6 are graphic representations of the aberrations in the lens of FIG. 4 with an object at infinity and at a short distance of 10.15f respectively.
Figure 6:
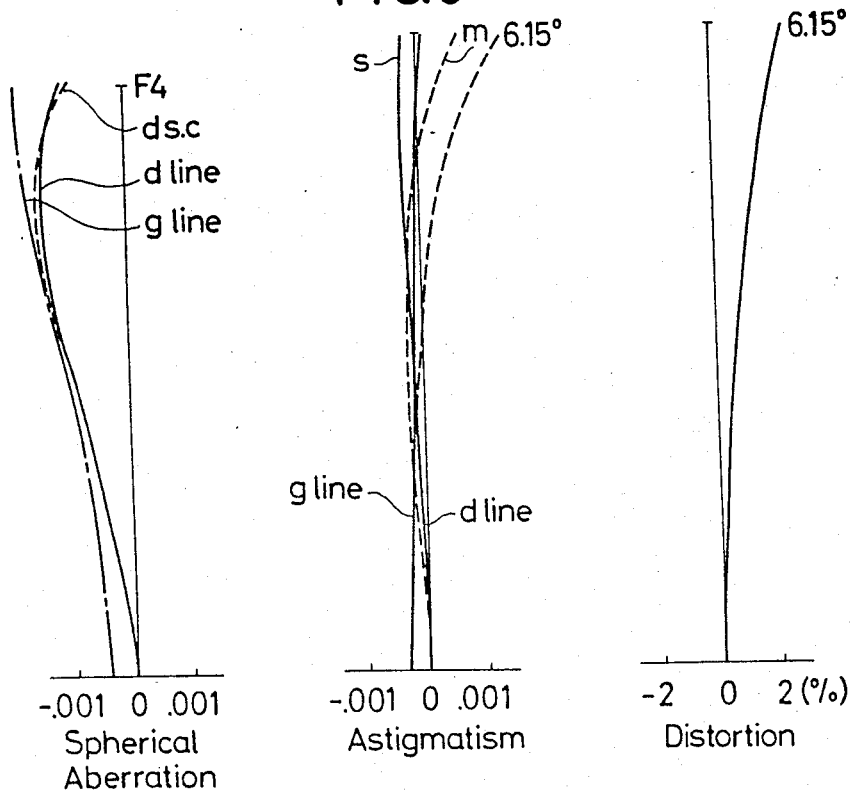
Figure 7:
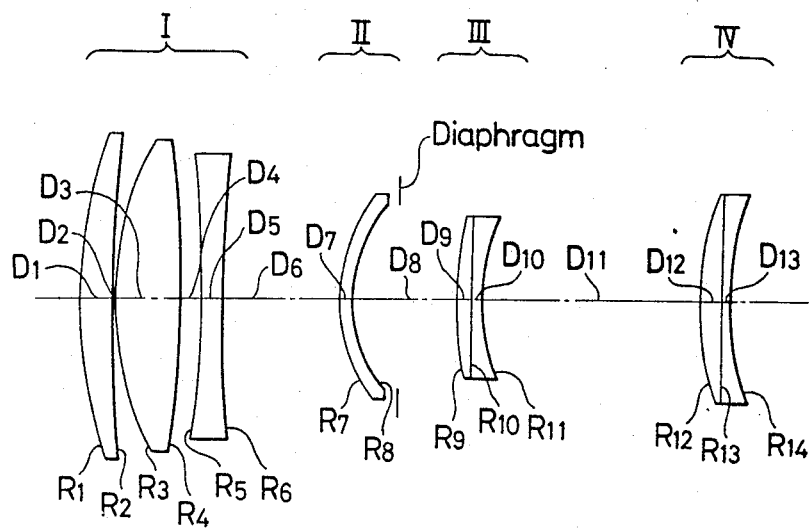
FIG. 7 is a lens block diagram showing still another embodiment of the invention.
Figure 8:
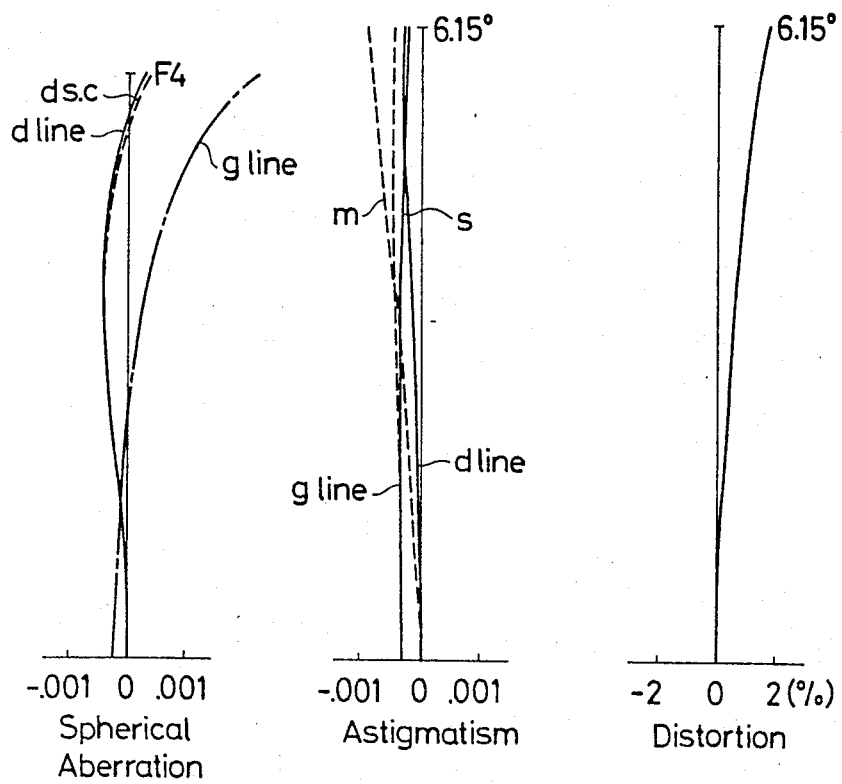
FIGS. 8 and 9 are graphic representations of the aberrations in the lens of FIG. 7 with an object at infinity and at the short distance of 9.13f respectively.
Figure 9:
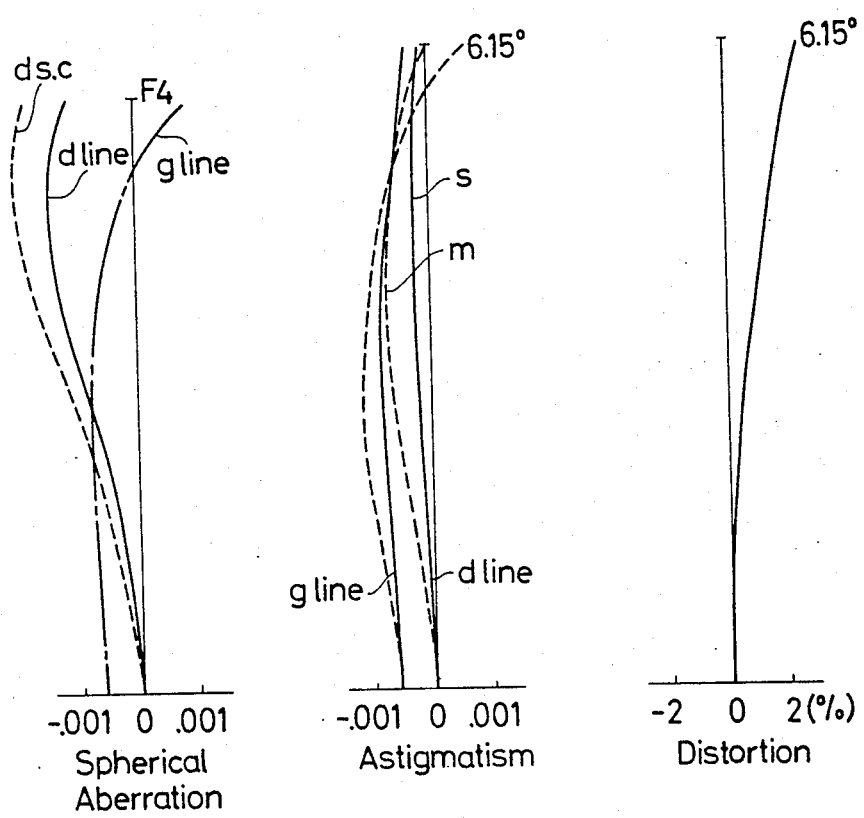

Three examples of embodiments of the invention are represented in FIGS. 1, 4 and 7, wherein the first member I consists of two positive lens elements and one negative lens element, the second member II is configured with the first surface convex to the front and with the rear surface of rearward concavity having a smallest radius of curvature in this member, the third member III is configured with the first surface convex to the front and with the rear surface of rearward concavity having a smallest radius of curvature in this member, and the fourth member IV is configured with the first surface convex to the front and with the rearmost surface concave to the rear. The third member may be employed as a focusing member which is moved to the rear as the object distance is decreased from infinity. A diaphragm is placed in a space between the second and third members II and III and close to the former so that, as the focal length of the third member is negative, the oblique pencil light after having passed through the third member enters the fourth member IV at a height larger than the effective diameter of the third member III.

In FIG. 1, the second member II consists of a negative meniscus singlet lens, the third member III consists of a doublet lens of a positive meniscus lens element and a negative meniscus lens element cemented together at their adjoining surfaces, and the fourth member IV consists of a positive meniscus singlet lens. In FIG. 4, the second member II consists of a positive meniscus component and a negative meniscus component, the third member III consists of a positive component and a negative component, and the fourth member IV consists of a positive meniscus singlet lens. In FIG. 7, the second member II consists of a negative meniscus singlet lens, the third member II consists of a doublet lens of a positive lens element and a negative lens element cemented together at their adjoining surfaces, and the fourth member IV consists of a doublet lens of a positive lens element and a negative lens element cemented together at their adjoining surfaces.

For the purpose of providing specific examples of telephoto lens systems as described and illustrated herein, and with references to the lens systems shown in FIGS. 1, 4 and 7, the following tabulation sets forth numerical data based, for convenience, upon a total focal length, f, of 1 millimeters for the radii of curvature, R, and the axial separations between the successive refracting surfaces, D, along with the corresponding indices of refraction, Nd, for the spectral d line of sodium and the Abbe numers, Vd, for the various lens elements. In the lower section of each of the tabulations there is given aberration coefficient values for spherical aberration I, coma II, astigmatism III, Petzval Sum P and distortion V with object at infinity.

EXAMPLE I

| f = 1 | F-number 1:4 | | 2ω = 12.3° | |
|---|---|---|---|---|
| Surface No. | R | D | Vd | Nd |
| 1 | 0.3488 | 0.0482 | 70.10 | 1.48749 |
| 2 | −0.4895 | 0.0199 | | 1. |
| 3 | −0.4278 | 0.0126 | 38.00 | 1.72342 |
| 4 | 1.7887 | 0.0029 | | 1. |
| 5 | 0.2946 | 0.0330 | 70.10 | 1.48749 |
| 6 | 33.8650 | 0.0617 | | 1. |
| 7 | 0.1607 | 0.0185 | 61.10 | 1.58913 |
| 8 | 0.1294 | variable | | 1. |
| 9 | 0.3936 | 0.0101 | 27.50 | 1.75520 |
| 10 | −130.8662 | 0.0076 | 41.90 | 1.66755 |
| 11 | 0.1989 | variable | | 1. |
| 12 | 0.2116 | 0.0126 | 27.50 | 1.75520 |
| 13 | 0.2193 | | | 1. |

| Thick Lens Separations during Focusing | | | |
|---|---|---|---|
| d | D8(S2) | D11(S3) | f |
| ∞ | 0.1320 | 0.1551 | 1.0 |
| 9.13f | 0.2254 | 0.0617 | 0.8439 |

| Surface No. | I | II | III | P | V |
|---|---|---|---|---|---|
| 1 | 5.1918 | 0.3119 | 0.0187 | 0.9395 | 0.0575 |
| 2 | 30.2812 | −15.0931 | 7.5228 | 0.6694 | −4.0833 |
| 3 | −37.6323 | 17.9930 | −8.6030 | −0.9811 | 4.5824 |
| 4 | 0.0004 | 0.0096 | 0.1894 | −0.2346 | −0.8914 |
| 5 | 2.6164 | 0.5413 | 0.1120 | 1.1121 | 0.2532 |
| 6 | 3.2516 | −2.6141 | 2.1016 | −0.0096 | −1.6818 |
| 7 | −0.4792 | −0.1984 | 0.0821 | 2.3069 | 0.9112 |
| 8 | −3.0642 | −0.9748 | −0.3101 | −2.8633 | −1.0095 |
| 9 | −0.0295 | 0.2006 | −1.3628 | 1.0929 | 1.8334 |
| 10 | 0.2427 | −0.1246 | 0.0639 | 0.0002 | −0.0329 |
| 11 | 0.0260 | 0.0505 | 0.0979 | −2.0118 | −3.7107 |
| 12 | −0.0272 | −0.1848 | −1.2535 | 2.0325 | 5.2831 |
| 13 | 0.0147 | 0.1503 | 1.5363 | −1.9613 | −4.3437 |
| Σ | 0.3926 | 0.0675 | 0.0313 | 0.0916 | 2.8223 |

EXAMPLE II

| f = 1 | F-number 1:4 | | 2ω = 12.3° | |
|---|---|---|---|---|
| Surface No. | R | D | Vd | Nd |
| 1 | 0.3708 | 0.0497 | 70.10 | 1.48749 |
| 2 | −0.5589 | 0.0280 | | 1. |
| 3 | −0.4576 | 0.0126 | 38.00 | 1.72342 |
| 4 | 1.5258 | 0.0024 | | 1. |
| 5 | 0.2533 | 0.0339 | 70.10 | 1.48749 |
| 6 | 3.9656 | 0.0524 | | 1. |
| 7 | 0.1501 | 0.0152 | 61.10 | 1.58913 |
| 8 | 0.1992 | 0.0025 | | 1. |
| 9 | 0.1975 | 0.0050 | 61.10 | 1.58913 |
| 10 | 0.1183 | variable | | 1. |
| 11 | 0.4630 | 0.0106 | 27.50 | 1.75520 |
| 12 | 1.3026 | 0.0025 | | 1. |
| 13 | 1.4362 | 0.0071 | 41.90 | 1.66755 |
| 14 | 0.1964 | variable | | 1. |
| 15 | 0.2269 | 0.0126 | 27.50 | 1.75520 |
| 16 | 0.2853 | | | 1. |

| Thick Lens Separations during Focusing | | | |
|---|---|---|---|
| d | D10(S2) | D14(S3) | f |
| ∞ | 0.1517 | 0.0913 | 1. |
| 10.15f | 0.2254 | 0.0176 | 0.8626 |

| Surface No. | I | II | III | P | V |
|---|---|---|---|---|---|
| 1 | 4.3189 | −0.3074 | 0.0218 | 0.8836 | −0.0644 |
| 2 | 22.1226 | 15.0027 | 10.1742 | 0.5862 | −7.2973 |
| 3 | −28.7180 | 18.5588 | −11.9934 | −0.9171 | 8.3434 |
| 4 | 0.0042 | 0.0158 | 0.0591 | −0.2750 | −0.8074 |
| 5 | 5.5081 | −0.0606 | 0.0006 | 1.2936 | −0.0142 |
| 6 | 2.4648 | −2.5306 | 2.5981 | −0.0826 | 2.5825 |
| 7 | −0.0334 | −0.0065 | −0.0012 | 2.4681 | 0.4853 |
| 8 | 0.3123 | 0.5491 | 0.9654 | −1.8601 | −1.5729 |
| 9 | −0.3060 | −0.5494 | −0.9861 | 1.8769 | 1.5989 |
| 10 | −5.2499 | −0.7053 | −0.0947 | −3.1314 | 0.4334 |
| 11 | −0.0826 | 0.3566 | −1.4746 | 0.9291 | 2.2556 |
| 12 | 1.4214 | −1.5618 | 1.7160 | −0.3302 | −1.5225 |
| 13 | −1.3968 | 1.4968 | −1.6040 | 0.2787 | 1.4202 |
| 14 | −0.0475 | −0.0953 | −0.1910 | −2.0376 | −4.4671 |
| 15 | −0.0262 | −0.1113 | −0.4730 | 1.8954 | 6.0422 |
| 16 | 0.0053 | 0.0823 | 1.2715 | −1.5076 | −3.6460 |
| Σ | 0.2935 | 0.1283 | −0.0114 | 0.0699 | 2.2624 |

EXAMPLE III

| | F = 1 | F-number 1:4 | | $2\omega = 12.3°$ |
|---|---|---|---|---|
| Surface No. | R | D | Vd | Nd |
| 1 | 6.4293 | 0.0253 | 70.10 | 1.48749 |
| 2 | 1.8527 | 0.0015 | | 1. |
| 3 | 0.2870 | 0.0507 | 70.10 | 1.48749 |
| 4 | −1.0759 | 0.0166 | | 1. |
| 5 | −0.9899 | 0.0152 | 27.50 | 1.75520 |
| 6 | 1.3118 | 0.0917 | | 1. |
| 7 | 0.1395 | 0.0096 | 61.10 | 1.58913 |
| 8 | 0.1232 | variable | | 1. |
| 9 | 0.3984 | 0.0101 | 27.50 | 1.75520 |
| 10 | 1.7566 | 0.0076 | 41.90 | 1.66755 |
| 11 | 0.1965 | variable | | 1. |
| 12 | 0.2569 | 0.0152 | 30.10 | 1.69895 |
| 13 | 2.0522 | 0.0076 | 38.00 | 1.72342 |
| 14 | 0.2728 | | | 1. |

| Thick Lens Separations during Focusing | | | |
|---|---|---|---|
| d | D8(S2) | D11(S3) | f |
| ∞ | 0.0804 | 0.1662 | 1. |
| 9.13f | 0.1596 | 0.870 | 0.8459 |

| Surface No. | I | II | III | P | V |
|---|---|---|---|---|---|
| 1 | 2.7841 | 0.1911 | 0.0131 | 0.7633 | 0.0533 |
| 2 | 0.0433 | −0.1417 | 0.4636 | −0.1768 | −0.9383 |
| 3 | 1.7023 | 0.1043 | 0.0063 | 1.1416 | 0.0703 |
| 4 | 22.8514 | −13.6988 | 8.2120 | 0.3045 | −5.1055 |
| 5 | −26.7342 | 15.8466 | −9.3930 | −0.4346 | 5.8253 |
| 6 | 1.2798 | −1.6387 | 2.0981 | −0.3279 | −2.2664 |
| 7 | −0.0353 | −0.0152 | −0.0065 | 2.6575 | 1.1442 |
| 8 | −1.7278 | −0.6416 | −0.2382 | −3.0073 | −1.2051 |
| 9 | −0.0450 | 0.2557 | −1.4524 | 1.0798 | 2.1156 |
| 10 | 0.1651 | −0.1329 | 1.1070 | −0.0170 | −0.0724 |
| 11 | 0.0054 | 0.0087 | 0.0142 | −2.0366 | −3.2897 |
| 12 | −0.0109 | −0.1142 | −1.1865 | 1.6008 | 4.3041 |
| 13 | −0.0116 | 0.0085 | −0.0062 | 0.0040 | 0.0016 |
| 14 | 0.0010 | 0.0382 | 1.4410 | −1.5384 | −3.6738 |
| Σ | 0.2674 | 0.0700 | 0.0726 | 0.0129 | −3.0368 |

| | f2 | f4 | S1 | S2 | S3 |
|---|---|---|---|---|---|
| Example I | −1.4345 | 3.4376 | 0.0617 | 0.1320 | 0.1551 |
| Example II | −1.567 | 1.379 | 0.0524 | 0.1517 | 0.0913 |
| Example III | −2.307 | 5.663 | 0.0917 | 0.0804 | 0.1662 |

What is claimed is:

1. A telephoto lens comprising:
   a first lens group consisting of a plurality of lenses, having a positive refractive power and being fixed during the focusing of said telephoto lens;
   a second lens group having a negative refractive power, positioned rearwardly of said first lens group and being fixed during the focusing of said telephoto lens;
   a third lens group having a negative refractive power, positioned rearwardly of said second lens group and axially moving for focusing of said telephoto lens; and
   a fourth lens group having a positive refractive power, positioned rearwardly of said third lens group; and characterized by the following relationships referring to a total focal length of unity:
   $1.379 \leq f_4 \leq 5.663$
   $0.0913 \leq S_3 \leq 0.1662$
   $1.4345 \leq |f_2| \leq 2.307$
   $(0.0524/0.1517) \leq S_1/S_2 \leq (0.0917/0.0804)$
   wherein f2 is the focal length of said second lens group; f4 is the focal length of said fourth lens group; S1 is the axial separation between said first lens group and said second lens group; S2 is the axial separation between said second lens group and said third lens group; and S3 is the axial separation between said third lens group and said fourth lens group.

2. A telephoto lens as described in claim 1, wherein said fourth lens group has a frontmost lens surface convex to the front and a rearmost lens surface concave to the rear.

3. A telephoto lens as described in claim 1, wherein said first lens group includes two positive lenses and one negative lens, each of said second, said third and said fourth lens groups has a frontmost lens surface convex to the front and a rearmost lens surface concave to the rear, and there is a diaphragm between said second and said third lens groups.

4. A telephoto lens comprising:
   a front convergent lens group consisting of a plurality of lenses;
   a fixed divergent lens group positioned rearwardly of said front convergent lens group;
   a movable divergent lens group positioned rearwardly of said fixed divergent lens group and movable for focusing; and
   a rear convergent lens group positioned rearwardly of said movable divergent lens group and having a frontmost lens surface convex to the front and a rearmost lens surface concave to the rear.

5. A telephoto lens as described in claim 4, wherein said rear convergent lens group is a positive meniscus lens.

6. A telephoto lens as described in claim 4, wherein said rear convergent lens group is a cemented lens of a positive lens and a negative lens.

7. A telephoto lens as described in claim 4, wherein there is a diaphragm between said fixed divergent lens group and said movable divergent lens group, and the diameter of a front lens in said rear convergent lens group is larger than that of a rear lens in said movable divergent lens group.

8. A rear focusing form telephoto lens comprising:
   a first lens group composed of a plurality of lenses, having a positive refracting power;
   a second lens group with its frontmost lens surface being convex in a forward direction and its rearmost lens surface being concave in a rearward direction, having a negative refracting power, and positioned after said first lens group;
   a third lens group movable along its optical axis for focusing of said telephoto lens, having a negative refracting power, and positioned after said second lens group, and
   a fixed lens with its front lens surface being convex in a forward direction, having a positive refracting power, and positioned after said third lens group.

9. A telephoto lens according to claim 8, in which said fixed lens is a doublet lens of a positive lens cemented together with a negative lens.

* * * * *